Sept. 9, 1947.  B. C. THOMSON  2,427,313
CANE PILER
Filed Sept. 26, 1944   8 Sheets-Sheet 7

Inventor
Byron C. Thomson
By Wilkinson & Mawhinney
Attorneys

Sept. 9, 1947.  B. C. THOMSON  2,427,313
CANE PILER
Filed Sept. 26, 1944  8 Sheets-Sheet 8
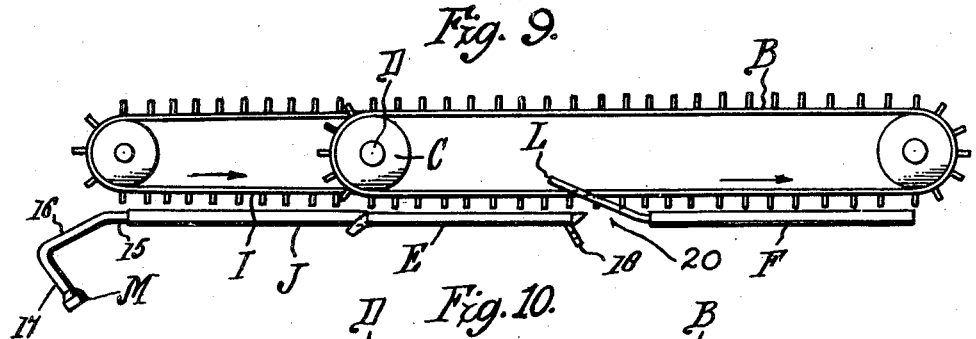
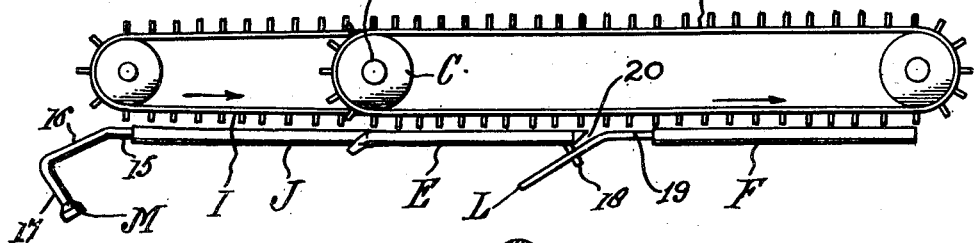
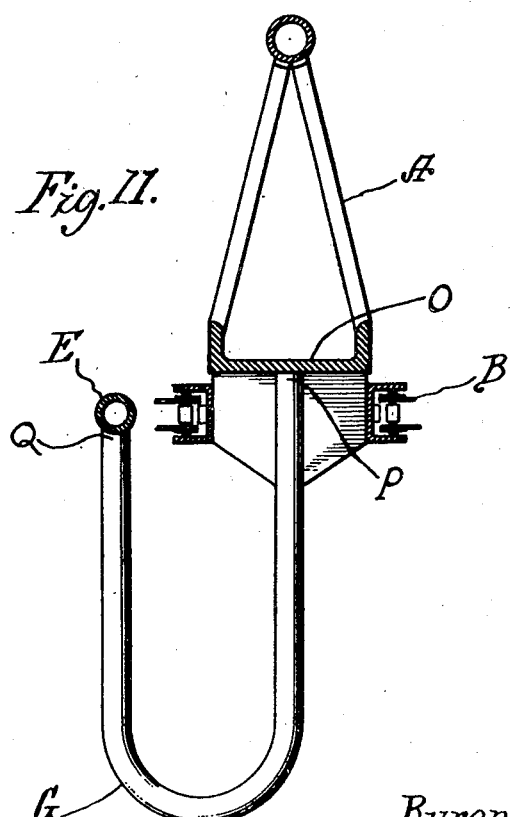
Inventor
Byron C. Thomson
By Wilkinson & Mawhinney
Attorneys Patented Sept. 9, 1947

2,427,313

UNITED STATES PATENT OFFICE 2,427,313

CANE PILER

Byron C. Thomson, Labadieville, La.

Application September 26, 1944, Serial No. 555,832

7 Claims. (Cl. 56—15)

The present invention relates to improvements in cane pilers and more particularly relates to an attachment for cane harvesters constructed and adapted to pile the cane in windrows in accordance with a prearranged plan, as hereinafter more fully described.

In accordance with the present practice of harvesting sugar cane with mechanical harvesters where the cane is planted in rows, the cane is piled parallel with the rows, such practice being usually termed "windrowing." When the cane is so harvested hand labor is necessary to transfer the cane from the position parallel with the rows to a position across and at right angles to the rows, placing the cane from two or more rows into what is called a "heap," in other words a "heap row" where it is subsequently picked up with conventional mechanical cane loaders and loaded into wagons.

The reason that cane from two or more rows is placed into a "heap pile" or "heap row," is to eliminate additional traveling by both the loaders and the wagons in the fields, which would be necessary if each row were piled separately, and to provide two clear or free rows through which loading and cane wagons may travel in loading and hauling cane.

It is an object of the invention to eliminate this hand labor and to in the first instance discharge the cane from the back of the harvester and place it crosswise the row instead of in the customary parallel position.

It is another object of the invention to accomplish this purpose by a simply constructed simple functioning attachment for a standard cane harvester which admits of the transfer of at least three rows of harvested cane onto a single "heap row" or "heap pile."

The invention has for a further advantage that it allows the burning of shucks and trash in cane between the time it is mechanically harvested and the time it is loaded. This permits delivery to the processing mill of commercially clean cane without the necessity of manual handling.

The method and device according to the present invention also eliminates the necessity of synchronizing mechanical harvesting with the loading and transport facilities. With the improved process and apparatus there is also eliminated the transfer of grass and weed growth in the transfer of cane to the "heap rows."

With the foregoing and other objects in view the invention will be more fully described hereinafter and more particularly pointed out in the appended claims.

In the drawings in which like parts are denoted by the reference characters throughout the several views, Figure 1 is a rear elevational view of a standard form of cane harvester illustrating the initial step of the improved method.

Figure 9 is a top plan view, taken on an enlarged scale of the lateral conveyors and their retaining bars with the parts in position to harvest row 2.

Figure 10 is a similar view showing the parts in position to harvest row 3, and

Figure 11 is a cross section taken through the frame of the attachment and its main conveyor and showing one of the arches.

Figure 1:
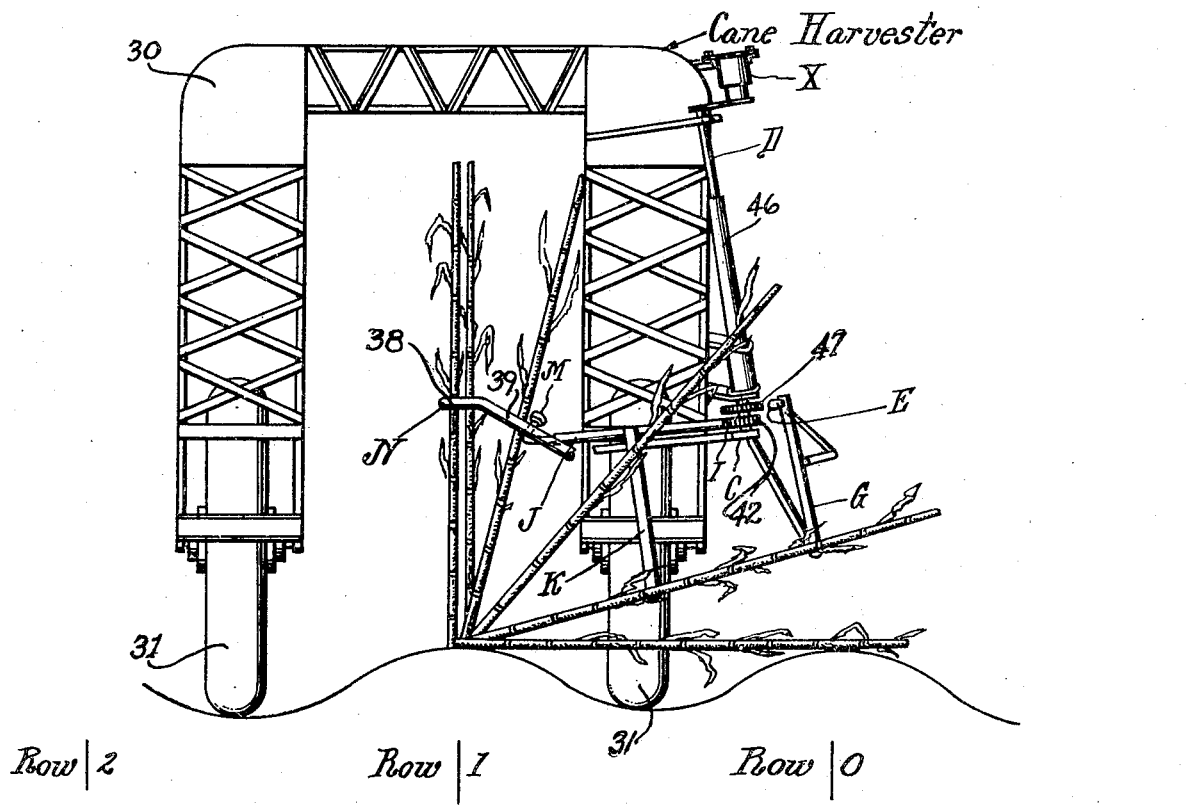

Referring more particularly to the drawings, 30 represents a cane harvester mounted on wheels 31 with the gathering endless chain conveyors 32 and 33 at its forward end leading to the spiral flight 51 on the rotary drum or scroll 52. This drum has threads on flights 51 that screw through the cane and draw the same to the rotary severing knife 54.

Figure 2:
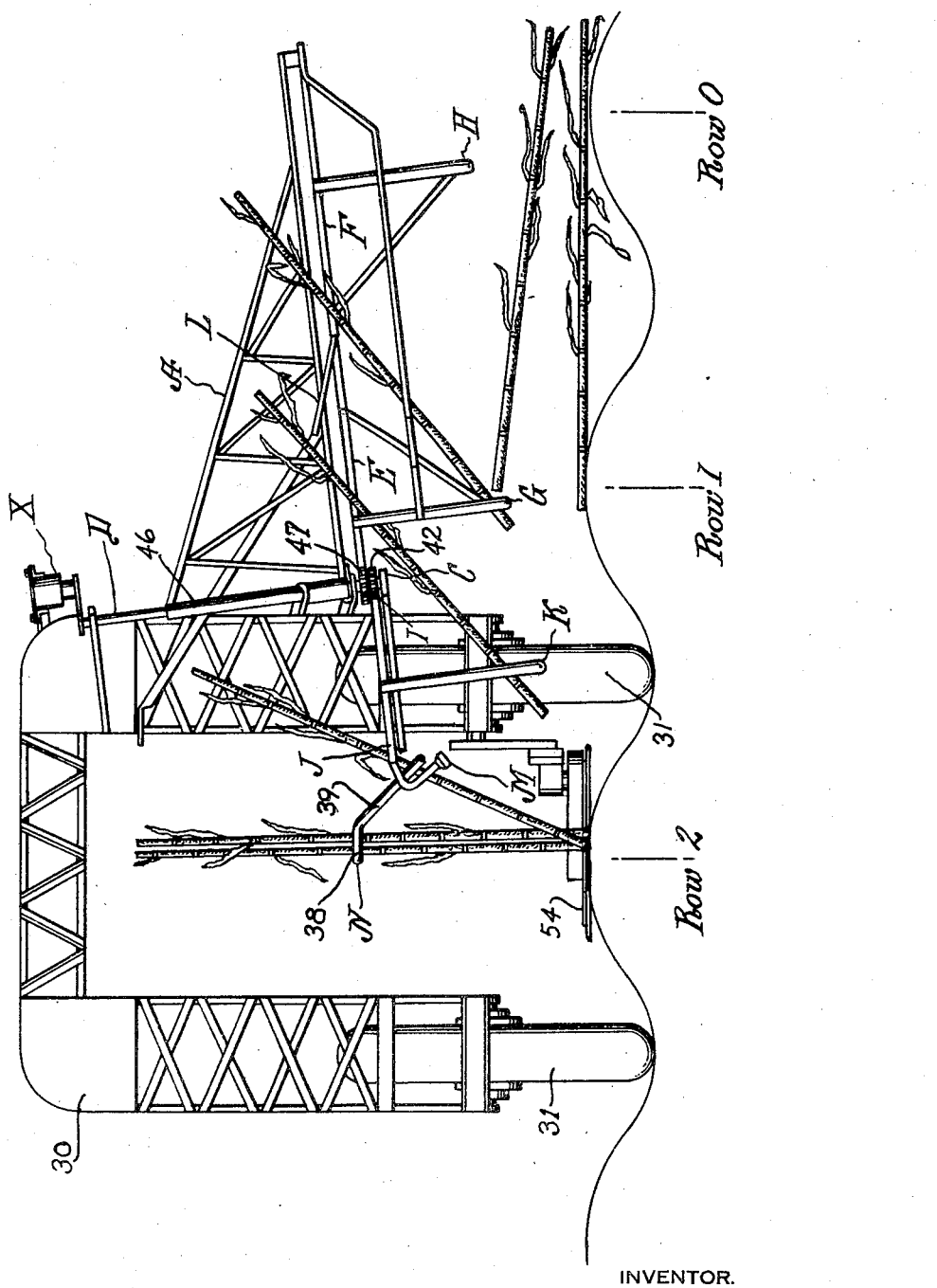
Figure 2 is a similar view showing the improved attachment in place and operating in accordance with the second phase of the improved method.
Figure 4:
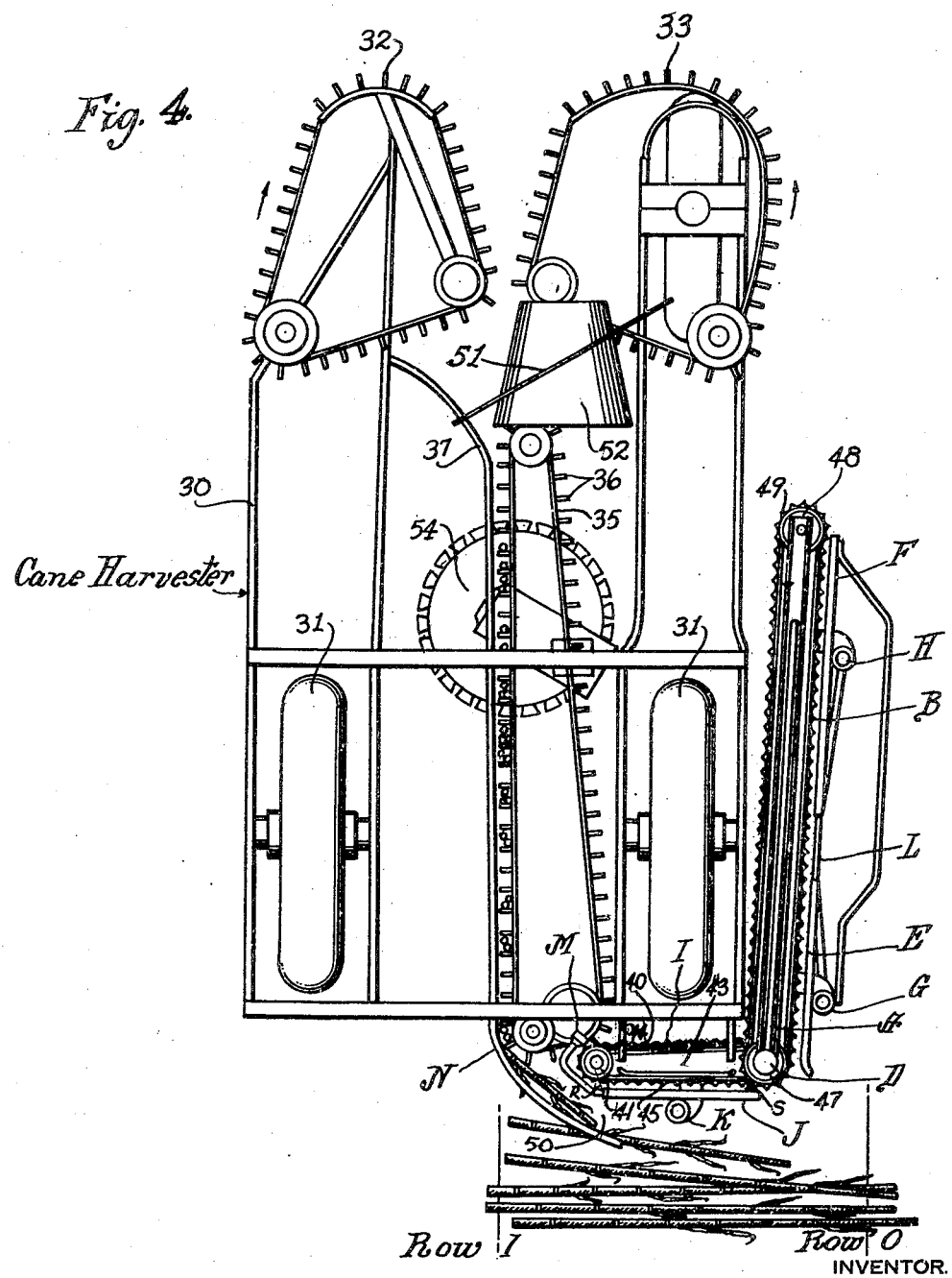
Figure 4 is a top plan view of the harvester shown in Figure 1, illustrating the initial step of cross piling of the cane into an original "heap row," and also illustrating the improved attachment with the lateral extension part thereof folded to inoperative position at the side of the harvester.

The proper location of the bottom severing knife 54 is shown in Figures 2 and 4; this arrangement is conventional in the art as shown by the Wurtele Patent 2,281,904, granted May 5, 1942. As the harvester moves forwardly the rotary knife 54 severs the stalks at the bottom.

The longitudinal conveyor 35 has projections 36 for receiving such cane stalks. The cane stalks are held between or against the projections 36 by a holding or pressure bar 37. At the rear delivery end of the conveyor is a deflector bar N which may be a continuation of the pressure bar 37 and which receives the cane stalks from the longitudinal conveyor 35. In Figure 4 this curved deflector bar N is shown in top plan view as being curved from the rear end of the pressure bar 37 in a wide sweeping curve transversely of the harvester 30 and spaced back of the rear portion of the longitudinal conveyor 35 whereby the conveyor 35 releases the cane stalks to the curved deflector bar N in the normal forward movement of the cane harvester 30.

As shown in Figure 1 the deflector bar N is preferably made with a substantially horizontal portion 38 and a diagonal portion 39 and as shown in Figures 1 and 4, on the first pass of the machine through the field over row 1 the deflector bar N receives the cane in an upright standing position with its severed butt end resting upon the ground on the top of row 1 and as the harvester 30 moves forward the curved deflector bar N, which engages about mid height of the cane stalks (Figure 1), induces those stalks to tilt laterally of the rows and to fall with the long axis of the cane stalks in a direction transversely of the rows and transversely of the direction of movement of the cane harvester 30. The rear free end of the deflector bar N is free and open for the passage and falling of the cane stalks except when a rotary deflector bar M is made to extend across the throat which is formed between the rear end of the longitudinal conveyor 35 and the curved deflector bar N, as hereinafter described and shown more particularly in Figure 8.

In the forward portion only of this throat projects the inner or receiving end of a fixed section I of a transverse conveyor. The transverse conveyor is made up of this fixed inner conveyor section I and the outer pivoted swinging conveyor section B.

The inner section I is composed of an endless chain 40 running substantially horizontally around sprockets 41 and 42. The sprockets may be carried by a suitable frame 43 carried by the rear end of the harvester by any suitable means for instance by the brackets 44. The chain may have suitable projections 45 which may be sharpened if desired as shown to advantage in Figures 4, 5, and 6 to bite into the cane barrels or stalks. A pressure or holding bar J is supported by an arched supporting member K substantially parallel and spaced back of the rear run of the endless chain 40 to confine the stalks against such rear run of the chain which moves in the direction of the arrow in Figures 9 and 10.

The outer pivoted conveyor section I is carried by a cantilever or other type frame A which has a pivotal bearing 46 about an upright shaft or post D mounted upon the rear corner portion of the harvester vehicle 30. The frame A is adapted to swing about the shaft D, as compare Figures 4 and 5. The frame A carries a substantially horizontally running endless chain B running over sprockets 47 and 48. The chain B has projections 49 which may be of the flat blunt form shown in Figures 9 and 10 or of the sharp pointed form shown in Figures 4, 5, and 6 to bite into the cane stalks or barrels.

Mounted in spaced relation rearwardly from the rear run of the conveyor chain B are two pressure or holding bars E and F. These holding or pressure bars E and F are endwise spaced apart to provide a gap 20 therebetween for the discharge of cane stalks. The end pressure bar F near the gap 20 is hollow to slidingly and rotatingly receive a shank 19 of a diagonal deflector bar L adapted in its outer position (Figure 10) to seat in a holding bracket 18.

Figure 5:
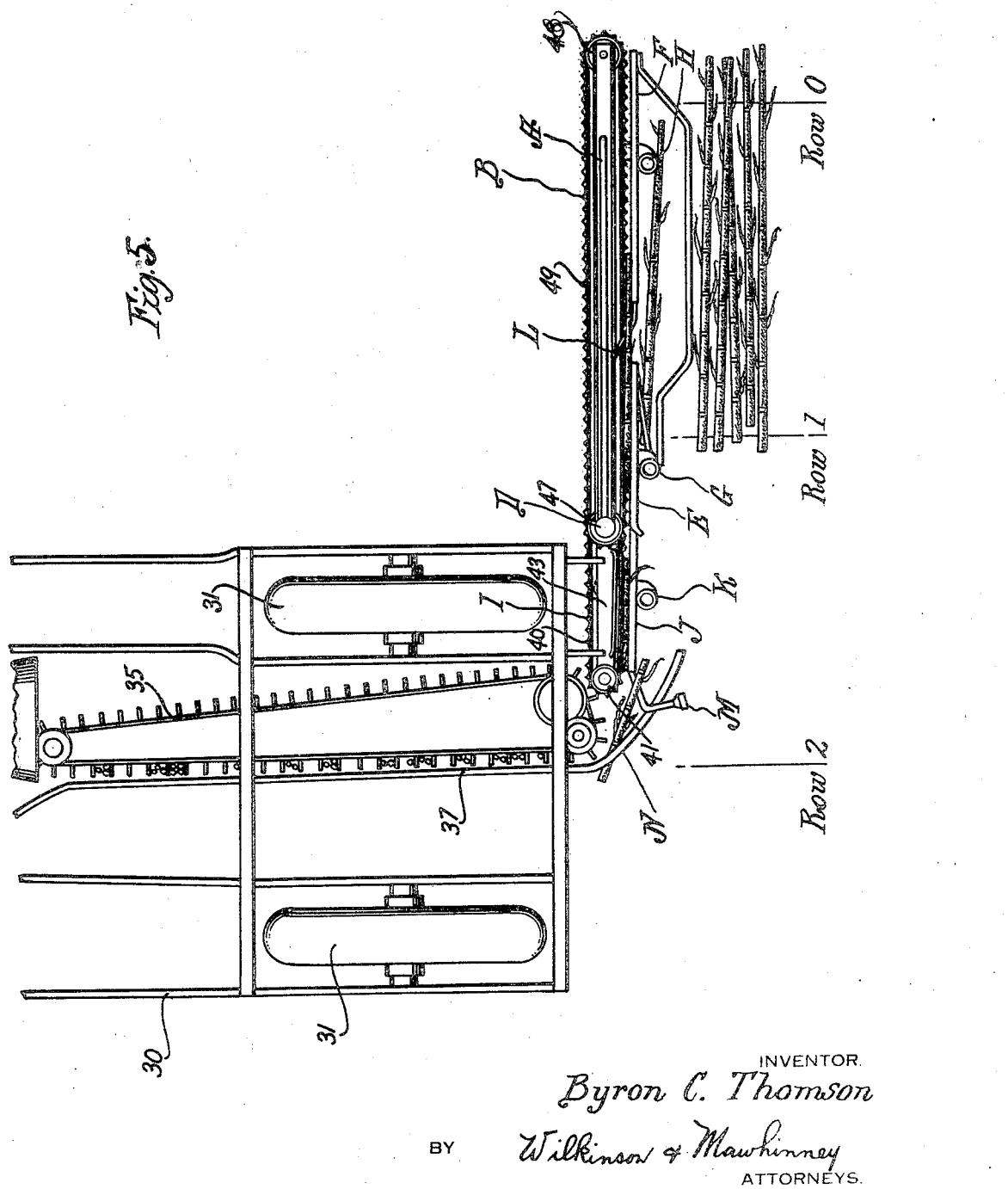
Figure 5 is a top plan view similar to Figure 4 with the attachment swung out to extended position and operating, like Figure 2, to deposit the cane from a second row to the original "heap pile."
Figure 6:
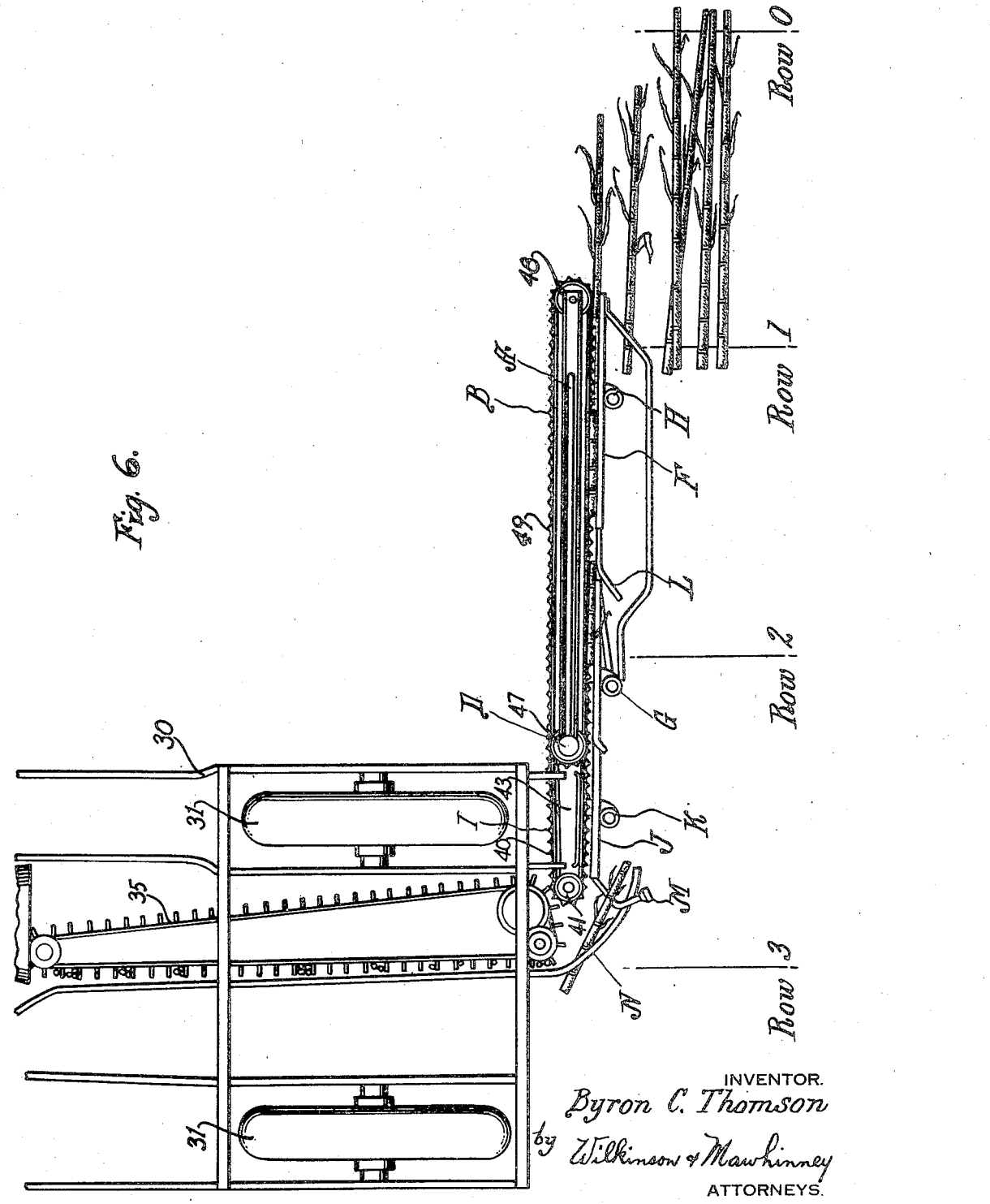
Figure 6 is also a top plan view similar to Figure 5 and showing the improved attachment operating to its fullest extent to deposit the cut cane from a third row onto the original "heap pile."

The holding bars E and F are in alignment with one another and with the holding bar J when the outer conveyor section B is swung to the outstanding position shown in Figures 5 and 6.

The inner end of pressure or holding bar J is also hollow to rotatably receive a shank 15 on the deflector bar M. An oblique portion 16 extends inwardly from the shank 15 and a right angular portion 17 extends off the oblique portion 16. The outer conveyor section frame A has a base O to which one end P of the arch G is affixed thereto and supported thereby, the other end Q of said arch G supporting the holding bar E which is spaced from the conveyor chain B, as best viewed in Figure 11. In a similar manner a pressure bar F is held in place by arches H, as shown in Figure 2; and the holding bar J of the inner fixed transverse conveyor section is held in place by other arches K. The space between the inner transverse conveyor I and its holding bar J is open at its inner end R and at its outer end S to permit the passage of cane through the conveyor I between the conveyor frame and the holding bar J as best seen in Figure 4.

The shaft D extends below the sleeve 46 and both sprockets 42 and 47 are affixed thereto. In other words these sprockets 42 and 47 respectively of the conveyor sections I and B are axially aligned and fixed to rotate with the shaft D which may not only be a pivotal support for the outer swinging conveyor section B but also the power shaft by which both conveyors I and B are driven from suitable source of power X derived from the power plant (not shown) of the harvester 30.

The frame A for the outer conveyor section B is rotatable about the shaft D so that it may be folded in a manner indicated in Figure 4 alongside the vehicle 30 when not in use or when the harvester is making the first pass or run down row 1. Or the frame A and swinging conveyor B may be swung out to the position indicated in Figures 5 and 6 where it extends at substantially right angles to the path of movement of the harvester and in alignment with the inner conveyor section I.

Figure 4 shows the relationship between the rear end of the harvester longitudinal conveyor 35, the curved deflector bar N and the inner or receiving end of the conveyor I and its holding bar J. It will be noted that the holding bar J is spaced forwardly of the rear free end of the curved deflector bar N in order to form a gap 50 therebetween for the free falling movement of the cane stalks when the harvester is making the first pass over row I.

It will be understood that by reason of the axial alignment of the sprockets 42 and 47 that the endless conveyors I and B are overlapped at their proximate ends whereby the rear runs of these conveyor sections act to continuously move the cane stalks in a generally upright position transversely of the harvester in a direction to the "off" side of such harvester. By "off" is meant the side of the harvester away from the standing cane.

Figure 3:
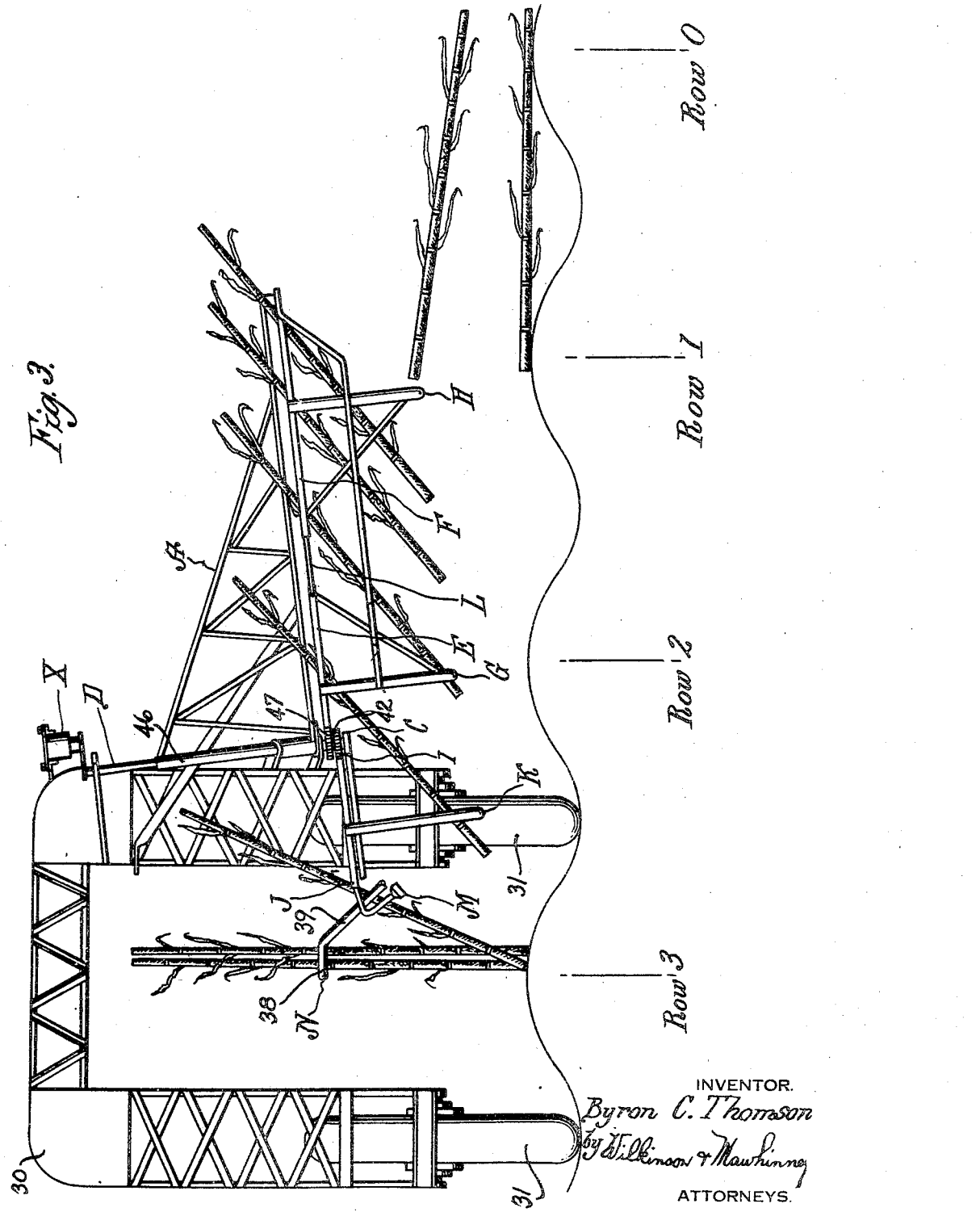
Figure 3 is also an end elevational view of a standard form of harvester with the improved attachment in place and operating in accordance with the third and final step of the improved method.

The cane stalks acquire considerable momentum from the transverse conveyor I, B, so that when released, either at the end of extension conveyor section B as shown in Figure 3, or through the gap 20 as shown in Figures 2 and 5, they fall and topple in a transverse direction crosswise the rows; the gap 20 and outer end of the transverse conveyor being so spaced laterally from the cutter 54 which necessarily travel down the row being presently cut that the cane is piled on the heap row across row 1 and row O as shown in Figures 2 and 3.

In the operation of the device, normally the deflector bar M is thrown out of the way and the frame A is swung or folded against the side of the machine, as indicated in Figure 4. This leaves the deflector bar N alone operative.

In piling cane harvested on row 1, cane discharging from the harvester in a vertical position is thrown by deflector bar N so that it drops across rows O and 1. This position is shown in Figures 1 and 4. Row O is row 3 of the preceding cycle of three rows harvested.

In the next operation, shown in Figure 2, which involves the harvesting of row 2, the frame A is swung at right angles to the direction of travel of the harvesting machine and deflector bar M is thrown into operating position. Deflector bars M and N cause the cane to fall into conveyor I. The cane is held between conveyor I and holding bar J and is carried at right angles to the travel of the machine. Upon reaching deflector bar L the cane is dropped out of the conveyor B, which forms a continuation of the conveyor I, and drops across rows O and 1. This places the cane from the second row cut on top of the cane dropped from the first row. The inverted arch G trips the butts or lower ends of the cane so that the cane falls in a horizontal position.

In the next operation, illustrated in Figure 3, the deflector lever L is thrown so that in effect it joins holding bars E and F into a continuous holding bar. This alteration makes this operation substantially the same as the operation over row 2. However, in this third operation the cane does not fall out of conveyor B until it reaches the end of the same. The length and proportions of this conveyor B are such that cane from row 3 is dropped on top of cane from rows 1 and 2. With the completion of the operations on row 3 the cane from rows 2 and 3 is piled with cane from row 1, and there are two free clean rows through which cane loaders and cane wagons may travel in order to load and haul cane. The cycle of three operations commences anew, row 3 of a preceding cycle becoming row O of a new cycle.

Figure 7:
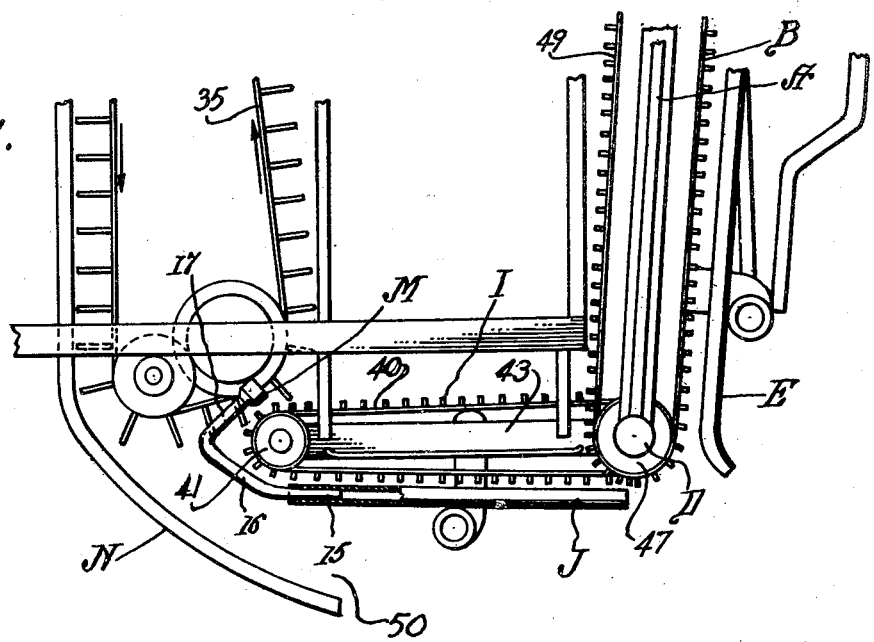
Figure 7 is a fragmentary plan view, taken on an enlarged scale, showing the harvester and attachment in position for harvesting row 1.
Figure 8:
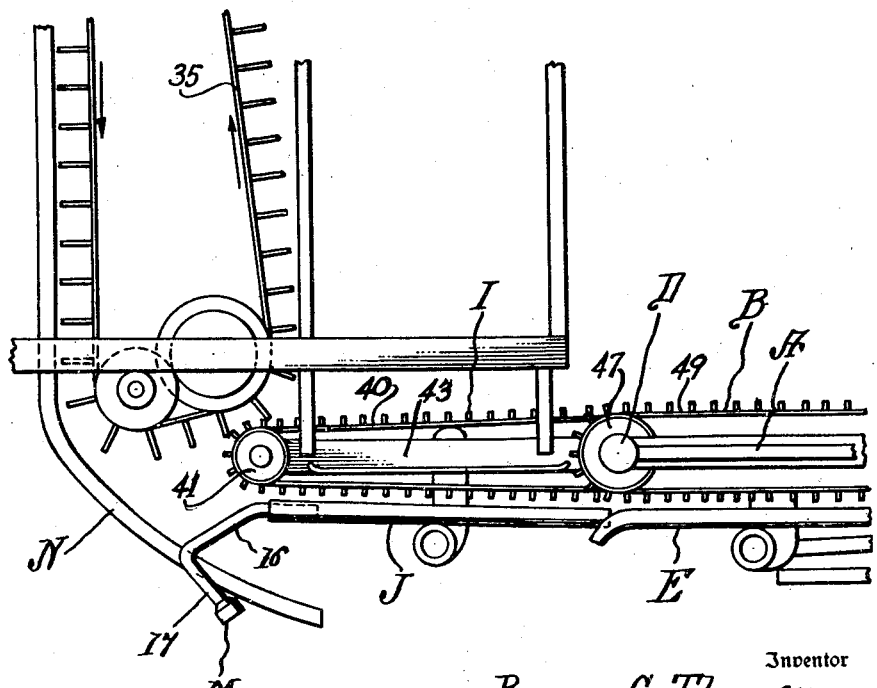
Figure 8 is a similar view with the attachment positioned for harvesting rows 2 and 3.

Referring more particularly to Figures 7 and 8 the deflector bar M is shown as having a shank 15 rotatably mounted in the holding bar J which is tubular whereby to rotate between the two positions shown in Figures 7 and 8. In Figure 7 the intermediate oblique portion 16 of the deflector bar M substantially parallels the deflector bar N and the right angular portion 17 of the deflector bar M closes the mouth of the conveyor I so that harvested cane follows deflector bar N. When deflector bar M is rotated 180° towards the back of the machine, as illustrated in Figure 8, it closes off the exit of cane along deflector bar N and deflects cane into conveyor I. This is the position for harvesting rows 2 and 3.

Referring more particularly to Figures 9 and 10, deflector bar L is a piece of shafting which both rotates and slides in pressure bar F which is a piece of pipe or tubing. When in position for harvesting row 2, deflector bar L is slid axially into pressure bar F and rotated toward the forward part of the machine so that the diagonal portion of the deflector bar L extends forwardly and it may rest on the top of conveyor B. In this position, cane traveling between conveyor B and pressure bar E is dropped as it leaves pressure bar E.

For harvesting row 3, deflector bar L is slid toward the left side of the machine and rotated toward the back of the machine, its diagonal portion being dropped into a slotted bracket 18 attached to the end of pressure bar E. In this position the straight part 19 of deflector bar L forms a link between the pressure bars E and F and in effect joins same into a continuous pressure or holding bar.

Figure 9 shows the condition of the parts for discharging cane through the gap 20 between the holding or pressure bars E and F. In this case the straight part or shank 19 is telescoped into the tubular pressure or holding bar F so as to remove the straight part 19 from the gap or opening 20. The diagonal deflector bar L in this Figure 9 is arranged to intercept the cane stalks moved by the conveyor B and deflect the same out through the gap or opening 20.

Figure 10 shows straight part or shank 19 pulled out from holding or pressure bar F so as to bridge the gap or opening 20 while the deflector bar part L is rotated away from conveyor B. Thus the deflector part L does not interfere with the movement of the cane stalks from holding bar E to holding bar F and the straight part 19 forms a continuous holding or pressure bar across the gap or opening 20 and compels the cane stalks to move out to the end of the conveyor B. Thus the straight part or shank 19 acts in the capacity of a sliding gate to open and close the gap or opening 20.

Figure 11 shows how the inverted arches G perform the double function of supporting the pressure or holding bars from the frame A and at the same time serve to engage the lower portions of the cane stalks.

It is obvious that various changes and modifications may be made in the details of construction and design of the above specifically described embodiment of this invention without departing from the spirit thereof, such changes and modifications being restricted only by the scope of the following claims.

What is claimed is:

1. For use with a cane harvester vehicle comprising a harvester frame, gathering and cutting means on the forward end of said frame for gathering and cutting the cane, a longitudinal conveyor mounted on said frame to receive the severed cane stalks; a cane piler comprising a transverse conveyor carried by said frame rearwardly of said longitudinal conveyor to receive the severed cane stalks from said longitudinal conveyor, said transverse conveyor composed of an inner fixed frame section and an outer swinging frame section, each said section comprising spaced sprockets having their axes substantially vertical, endless chains the longitudinal runs of which are substantially horizontal to each other around said sprockets, projections extending out substantially horizontal from said chains, holding bars carried by said transverse conveyor sections and being spaced from the runs of the chains of said transverse conveyor sections, arched members carried by said transverse conveyor sections supporting the respective holding bars from the transverse conveyor section frames, rigid means on said frame supporting the inner transverse conveyor on said harvester frame, the space between said inner transverse conveyor section and its holding bar being open at its inner and outer ends, the proximated sprockets on the inner and outer sections of said transverse conveyor being in substantially axial alignment with the chains of the two sections overlapped at their proximate ends, a post journaled substantially vertical at the "off" side of the harvester frame and passing through and affixed to both said aligned proximate sprockets, and bearing means carried by said post swingingly supporting the outer conveyor section about said post.

2. For use with a cane harvester vehicle comprising a frame, cane-cutting means on the forward portion of the frame, and a longitudinal conveyor mounted on said frame to receive the severed cane stalks from the cutting means; a cane piler comprising a transverse conveyor carried by said harvester frame having an inner end positioned to receive the severed cane stalks from the rear end of the harvester longitudinal conveyor, laterally curved deflecting means on the harvester frame positioned to be engaged by the stalks delivered from the harvester longitudinal conveyor and guiding the stalks laterally of the harvester frame to the side thereof away from the standing cane and to the inner end of the transverse conveyor, said transverse conveyor comprising a conveyor frame, spaced sprockets on the conveyor frame having their axes substantially vertical, an endless chain running substantially horizontally around said sprockets and having inwardly and outwardly moving longitudinal runs, projections extending out substantially horizontally from said chain, a pressure bar, arched members one end of which is carried by said transverse conveyor frame and the other end of which carries said pressure bar substantially parallel with and spaced horizontally from the outwardly moving run of said chain, the space between the pressure bar and chain being open at an inner portion to receive the stalks and at an outer portion to discharge the stalks, and driving means connected to drive said chain.

3. For use with a cane harvester vehicle comprising a frame, cane-cutting means on the forward portion of said frame, and a longitudinal conveyor mounted on said frame to receive the severed cane stalks from the cutting means; a cane piler comprising a transverse conveyor carried by said harvester frame having an inner end positioned to receive the severed cane stalks from the rear end of the harvester longitudinal conveyor, laterally curved deflecting means on the harvester frame positioned to be engaged by the stalks delivered from the harvester longitudinal conveyor and guiding the stalks laterally of the harvester frame to the side thereof away from the standing cane and to the said inner end of the transverse conveyor, said transverse conveyor composed of an inner fixed section and an outer swinging section, each section comprising a frame, spaced sprockets on the conveyor frame having their axes substantially vertical, endless chains running substantially horizontally around said sprockets and having inwardly and outwardly moving longitudinal runs, projections extending out substantially horizontally from said chains, pressure bars carried by said transverse conveyor sections and being spaced from the outwardly moving runs of said chains, arched members carried by the respective conveyor frames for supporting the pressure bars from said conveyor frames, the space between said pressure bars and chains being open at an inner portion of the transverse conveyor to receive the stalks and at an outer portion to discharge the stalks, the proximate sprockets of the inner and outer sections being in substantially axial alignment with the chains of the two sections overlapped at their proximate ends, a post journaled substantially vertically at the "off" side of the harvester vehicle and passing through and affixed to both said aligned proximate sprockets, and bearing means swingingly supporting the outer conveyor section about said post.

4. For use with a cane harvester vehicle comprising a frame, cutting means on the forward portion of said frame for cutting the cane, a longitudinal conveyor mounted on said frame to receive the severed cane stalks, a laterally curved deflector means carried by the frame rearwardly of said longitudinal conveyor positioned to receive the cane stalks from said conveyor and for deflecting the same laterally of the harvester frame to the side thereof away from the standing cane; a cane piler comprising a transverse conveyor carried by said harvester frame forwardly of said deflector means, said transverse conveyor composed of an inner fixed section and an outer swinging section, each said section comprising a frame, spaced sprockets on the conveyor frame having their axes substantially vertical, endless chains running around said sprockets having inwardly and outwardly moving longitudinal runs disposed substantially horizontally, projections extending out substantially horizontally from said chains, pressure bars carried by said transverse conveyor sections and being spaced from the outwardly moving runs of said chains, arched members carried by the respective section frames for supporting the pressure bars from said section frames, the space between said pressure bars and chains being open at inner and outer ends of the conveyor sections, the proximate sprockets of the inner and outer sections of said transverse conveyor being in substantially axial alignment with the chains of the two sections overlapped at their proximate ends, a post journaled substantially vertically at the "off" side of the harvester vehicle and passing through and affixed to both said aligned proximate sprockets, and bearing means swingingly supporting the outer conveyor section about said post.

5. For use with a cane harvester vehicle comprising a frame, cutting means on the forward portion of said frame for cutting the cane, a longitudinal conveyor mounted on said frame to receive the severed cane stalks, a laterally curved deflector means carried by the frame rearwardly of said longitudinal conveyor positioned to receive the cane stalks from said conveyor and for deflecting the same laterally of the harvester frame to the side thereof away from the standing cane; a cane piler comprising a transverse conveyor carried by said harvester frame forwardly of said deflector means, said transverse conveyor composed of an inner fixed section and an outer swinging section, each said section comprising a frame, spaced sprockets on the conveyor frame having their axes substantially vertical, endless chains running around said sprockets having inwardly and outwardly moving longitudinal runs disposed substantially horizontally, projections extending out substantially horizontally from said chains, pressure bars carried by said transverse conveyor sections and being spaced from the outwardly moving runs of said chains, arched members carried by the respective section frames for supporting the pressure bars from said conveyor frames, the space between said pressure bars and chains being open at inner and outer ends of the conveyor sections, the proximate sprockets of the inner and outer sections of said transverse conveyor being in substantially axial alignment with the chains of the two sections overlapped at their proximate ends, a post journaled substantially vertically at the "off" side of the harvester vehicle and passing through and affixed to both said aligned proximate sprockets, bearing means swingingly supporting the outer conveyor section about said post, said pressure bar for the outer section of said transverse conveyor having a gap intermediate its ends, and a movable member carried by said outer section of said conveyor for bridging or opening the gap.

6. For use with a cane harvester vehicle comprising a harvester frame, cutting means on the forward portion of said frame for cutting the cane, a longitudinal conveyor mounted on said frame to receive the severed cane stalks, a laterally curved deflector member carried by the frame rearwardly of said longitudinal conveyor positioned to receive the cane stalks from said conveyor and for deflecting the same laterally of the harvester frame to the side thereof away from the standing cane; a cane piler comprising a transverse conveyor carried by said harvester frame forwardly of said curved deflector member, said transverse conveyor composed of an inner fixed and an outer swinging section, each said section comprising a frame, spaced sprockets carried by the conveyor frame having their axes substantially vertical, endless chains running substantially horizontally around said sprockets, projections extending out substantially horizontally from said chains, pressure bars carried by said transverse conveyor sections and being spaced from the rear runs of the chains of said transverse conveyor sections, arched members carried by said transverse conveyor sections supporting the respective pressure bars from the transverse conveyor section frames, rigid means on said harvester frame supporting the inner transverse conveyor section on said harvester frame with said pressure bar spaced forwardly of the adjacent portion of said curved deflecting bar forming a discharge mouth therebetween, the space between said inner transverse conveyor chain and its pressure bar being open at its inner and outer ends, selective means carried by said inner section of said transverse conveyor to open or close said discharge mouth, the proximate sprockets of the inner and outer sections of said transverse conveyor being in substantially axial alignment with the chains of the two sections overlapped at their proximate ends, a post journaled substantially vertically at the "off" side of the harvester vehicle and passing through and affixed to both said aligned proximate sprockets, bearing means swingingly supporting the outer conveyor section about said post, said pressure bar for the outer section of said transverse conveyor having a gap intermediate its ends, and a movable member carried by said outer section of said conveyor for bridging or opening the gap.

7. For use with a cane harvester vehicle comprising a frame, cane-cutting means on the forward portion of the frame, and a longitudinal conveyor mounted on said frame to receive the severed cane stalks from the cutting means; a cane piler comprising a transverse conveyor carried by said harvester frame having an inner end positioned to receive the severed cane stalks from the rear end of the harvester longitudinal conveyor, said transverse conveyor comprising a conveyor frame, spaced sprockets on the conveyor frame having their axes substantially vertical, an endless chain running substantially horizontally around said sprockets and having inwardly and outwardly moving longitudinal runs, projections extending out substantially horizontally from said chain, a pressure bar, arched members one end of which is carried by said transverse conveyor frame and the other end of which carries said pressure bar substantially parallel with and spaced horizontally from the outwardly moving run of said chain, the space between the pressure bar and chain being open at an inner portion to receive the stalks and at an outer portion to discharge the stalks, and driving means connected to drive said chain.

BYRON C. THOMSON.

REFERENCES CITED

The following references are of record in the file of this patent:

UNITED STATES PATENTS

| Number | Name | Date |
|---|---|---|
| 58,702 | Whiting | Oct. 9, 1866 |
| 420,376 | Bouvee | Jan. 28, 1890 |
| 498,205 | Burden | May 23, 1893 |
| 736,450 | Sharpe | Aug. 18, 1903 |
| 758,739 | Culp | May 3, 1904 |
| 1,122,741 | Hadley | Dec. 29, 1914 |
| 1,162,869 | Mathews | Dec. 7, 1915 |
| 1,276,623 | Corbin | Aug. 20, 1918 |
| 1,295,331 | Knotts | Feb. 25, 1919 |
| 1,321,721 | Corbin | Nov. 11, 1919 |
| 1,365,955 | Scranton | Jan. 18, 1921 |
| 1,823,387 | Campbell | Sept. 15, 1931 |
| 1,901,889 | Badgley | Mar. 21, 1933 |
| 2,224,662 | Thomson et al. | Dec. 10, 1940 |
| 2,251,581 | Soefje et al. | Aug. 5, 1941 |
| 2,281,904 | Wurtele | May 5, 1942 |